United States Patent [19]
Koto

[11] Patent Number: 4,520,374
[45] Date of Patent: May 28, 1985

[54] INK JET PRINTING APPARATUS

[75] Inventor: Haruhiko Koto, Shiojiri, Japan

[73] Assignees: Epson Corporation; Kabushiki Kaisha Suwa Seikosha, both of Tokyo, Japan

[21] Appl. No.: 433,191

[22] Filed: Oct. 6, 1982

[30] Foreign Application Priority Data

| | | | |
|---|---|---|---|
| Oct. 7, 1981 | [JP] | Japan | 56-159896 |
| Oct. 8, 1981 | [JP] | Japan | 56-160685 |
| Oct. 8, 1981 | [JP] | Japan | 56-160686 |

[51] Int. Cl.³ G01D 15/16
[52] U.S. Cl. 346/140 R; 138/44
[58] Field of Search 346/140 PD, 75; 138/44; 400/126

[56] References Cited

U.S. PATENT DOCUMENTS

| | | | |
|---|---|---|---|
| 3,852,773 | 12/1974 | Sicking | 346/140 PD |
| 4,068,144 | 1/1978 | Toye | 346/140 PD |
| 4,104,645 | 8/1978 | Fischbeck | 346/140 PD |
| 4,106,032 | 8/1978 | Miura | 346/140 PD |
| 4,184,169 | 1/1980 | Taylor | 346/140 PD |
| 4,223,324 | 9/1980 | Yamamori | 346/140 PD |
| 4,224,826 | 9/1980 | McLoughlin | 138/44 |
| 4,284,996 | 8/1981 | Greve | 346/140 PD |
| 4,383,264 | 5/1983 | Lewis | 346/140 PD |
| 4,395,719 | 7/1983 | Majewski | 346/140 PD |
| 4,435,721 | 3/1984 | Tsuzuki | 346/140 PD |

FOREIGN PATENT DOCUMENTS

| | | | |
|---|---|---|---|
| 2657586 | 6/1978 | Fed. Rep. of Germany | 346/140 PD |
| 148531 | 11/1979 | Japan | 346/140 PD |

*Primary Examiner*—E. A. Goldberg
*Assistant Examiner*—Mark Reinhart
*Attorney, Agent, or Firm*—Blum Kaplan Friedman Silberman & Beran

[57] ABSTRACT

An ink jet printing apparatus which ejects ink towards a recording medium. The apparatus includes a nozzle having a plurality of nozzles and a plurality of pressurization chambers. Each nozzle orifice is in fluid communication with one of the pressurization chambers. An ink supply system supplies ink to each of the pressurization chambers. Each pressurization chamber includes first and second transducers which selectively deform the respective pressurization chambers for ejecting ink out of the nozzles. Each first and second transducers are selectively driven by independent driving circuits.

31 Claims, 27 Drawing Figures

FIG. 1
PRIOR ART
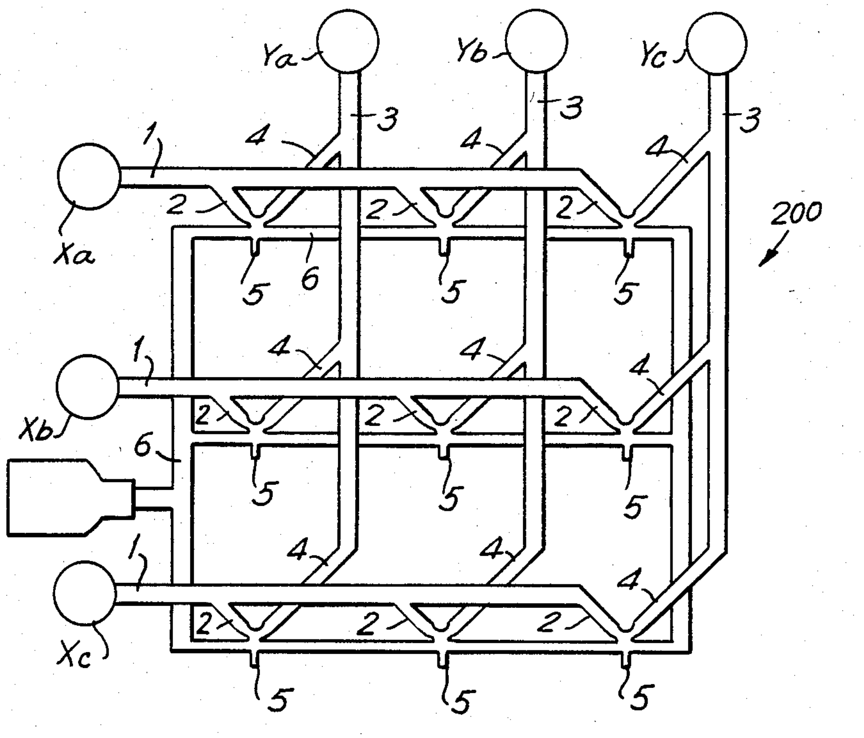
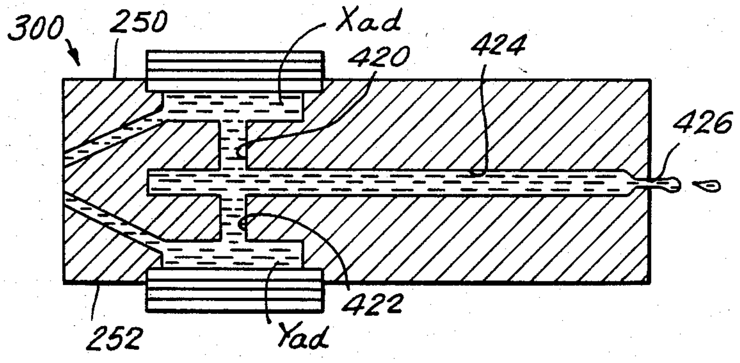
FIG. 2
PRIOR ART

FIG. 5
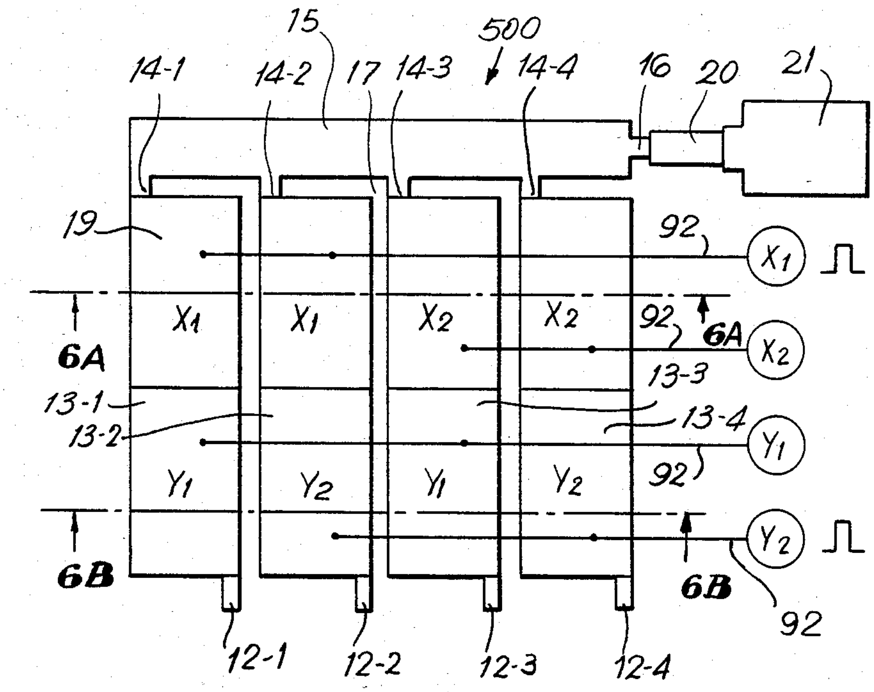
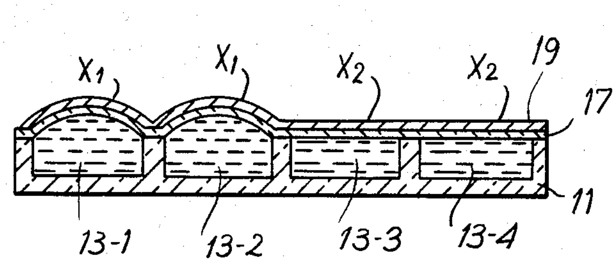
FIG. 6A
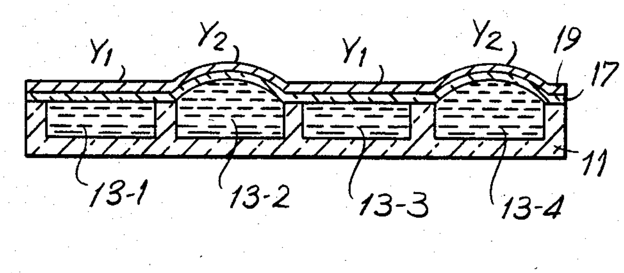
FIG. 6B

FIG. 7A
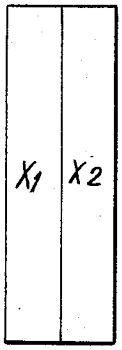
FIG. 7B
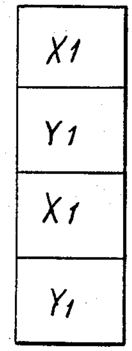
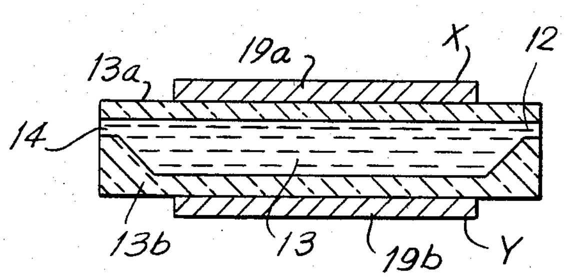
FIG. 8

FIG. 9
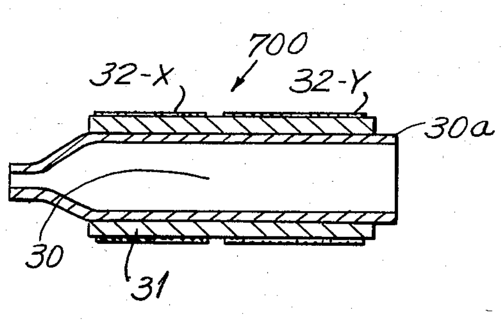
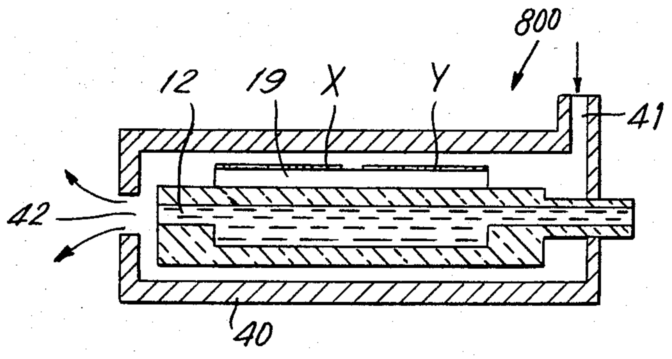
FIG. 10

FIG. 11
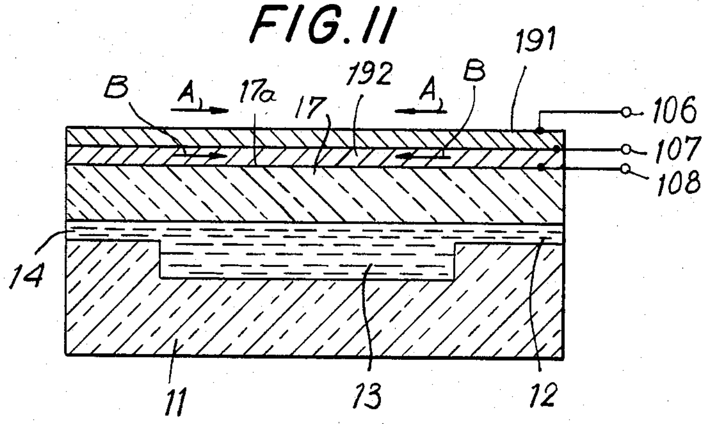
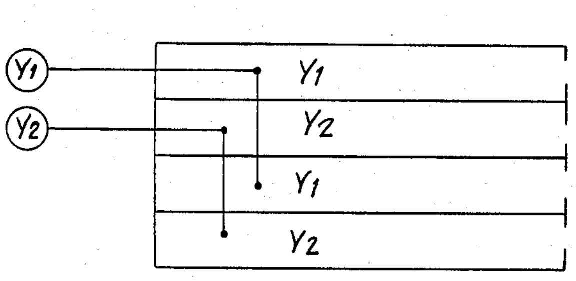
FIG. 12B
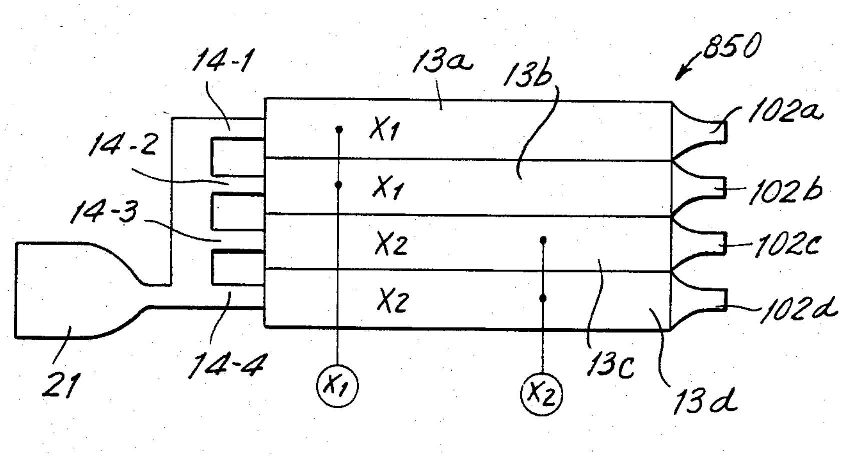
FIG. 12A

FIG. 16A
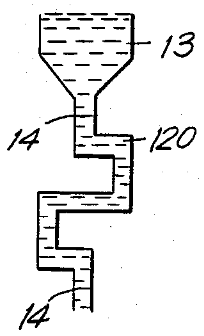
FIG. 16B
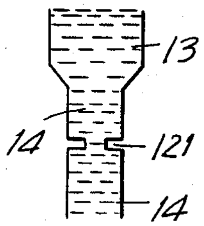
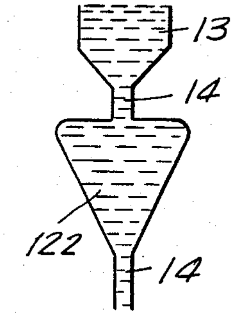
FIG. 16C
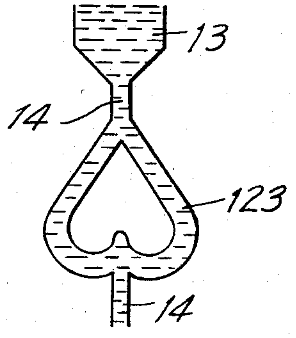
FIG. 16D

FIG. 18
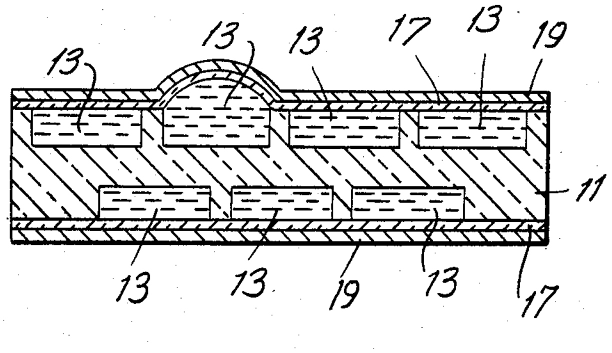
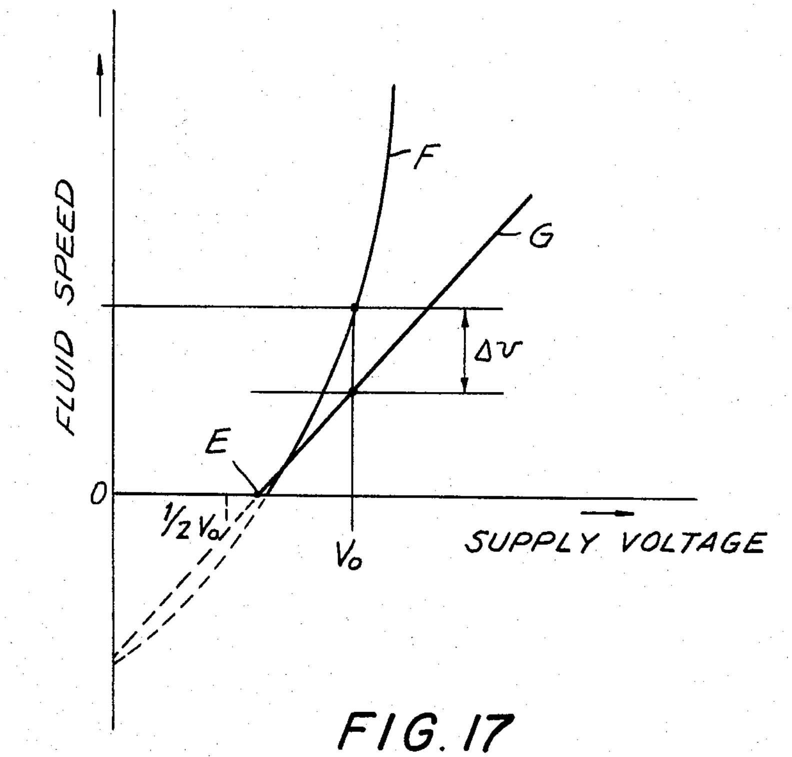
FIG. 17

INK JET PRINTING APPARATUS

BACKGROUND OF THE INVENTION

The present invention is directed to an ink jet printing apparatus and, in particular, to an ink jet printing apparatus having an improved nozzle construction which provides for a multi-nozzle head with multiplex drive which requires fewer component parts. The ink jet printing apparatus of the present invention includes an ink-on-demand-type ink jet print head having a highly integrated multi-nozzle.

It is desirable to provide ink-on-demand type ink jet print heads with multiple nozzles to thereby highly integrate the nozzle. Such highly integrated print heads have been put to practical use in printing devices. However, where the number of nozzles is increased with higher integration in an ink jet print head, the increment of piezoelectric elements, wires and drive transistors corresponding to the nozzles is increased. This results in an increase in cost and higher complexity of a printer incorporating such a highly integrated ink jet print head.

Various proposals have been advanced for reducing problems encountered in integrated ink jet print heads. Several such proposals are described in U.S. Pat. No. 4,104,645 issued on Aug. 1, 1978. As described in detail hereinbelow, such constructions suffer from several disadvantages such as difficulty in fabrication and difficulty in disposing the nozzle orifices in close proximity. Accordingly, it is desired to provide an improved ink jet printing apparatus having a highly integrated multiple nozzle construction which avoids the problems encountered in prior art constructions.

SUMMARY OF THE INVENTION

Generally speaking, in accordance with the present invention, an ink jet printing apparatus which ejects ink towards a recording medium for forming images and characters thereon, is provided. The ink jet printing apparatus includes a plurality of nozzles and a plurality of pressurization chambers. Each nozzle is in fluid communication with one of the pressurization chambers. An ink supply system supplies ink to each of the pressurization chambers. Each pressurization chamber includes first and second transducers which are drivable to selectively deform the pressurization chambers to which they correspond for ejecting ink out of the respective nozzles. Each of the first and second transducers are selectively driven by independent driving circuits.

In a preferred embodiment, the nozzles and pressurization chambers are formed on a single surface of a plate and the pressurization chambers are disposed proximate the nozzles to which they correspond. The first and second transducers act to first expand the pressurization chambers to permit an excess amount of ink to flow therein and, second, to contract thereafter to force the ink out of the nozzles.

Accordingly, it is an object of the present invention to provide an improved ink jet printing apparatus.

Another object of the present invention is to provide a multi-nozzle ink jet print head driven by utilizing multiplex drive which can be fabricated easily.

Yet another object of the present invention is to provide a multi-nozzle print head having low impedance in the flow passages and which effects high efficiency in ink ejection.

A further object of the present invention is to provide a small-sized print head in which nozzles are arranged in high density.

Still a further object of the present invention is to provide an improved ink jet print head which exhibits quick response in ejecting ink.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic fluid circuit illustrating the operation of an ink jet print head nozzle constructed in accordance with the prior art;

FIGS. 2 and 3 are cross-sectional views of ink jet print head nozzles constructed in accordance with the prior art;

FIG. 5 is a schematic top plan view of an ink jet printing apparatus constructed in accordance with the present invention for explaining principles of operation of the present invention;

FIG. 6A is a sectional view taken along line 6A—6A of FIG. 5;

FIG. 6B is a sectional view taken along line 6B—6B of FIG. 5;

FIGS. 7A and 7B are modified schematics for explaining the construction of a modification of the ink jet printing apparatus depicted in FIG. 4A;

FIG. 8 is a side sectional view illustrating an alternative embodiment of the ink jet printing apparatus of the present invention;

FIG. 9 is a side sectional view illustrating another embodiment of the ink jet printing apparatus of the present invention;

FIG. 10 is a sectional view illustrating a modified embodiment of the ink jet printing apparatus of the present invention in which a cover is utilized;

FIG. 11 is a side sectional view illustrating another embodiment of the ink jet printing apparatus of the present invention;

FIGS. 12A and 12B are top plan schematic views for explaining the operation of multiplex drive of the ink jet printing apparatus depicted in FIG. 4A;

FIGS. 16A, 16B, 16C and 16D are schematic views illustrating alternative shapes for ink supply passages for use in the ink jet printing apparatus of the present invention;

FIG. 17 is a graph depicting fluid speed as a function of supply voltage for explaining the ink ejection features in using the several ink supply passages depicted in FIGS. 16A through 16D; and FIG. 18 is a sectional view illustrating another embodiment of the ink jet printing apparatus of the present invention.

DESCRIPTION OF THE PREFERRED EMBODIMENTS

Figure 3:
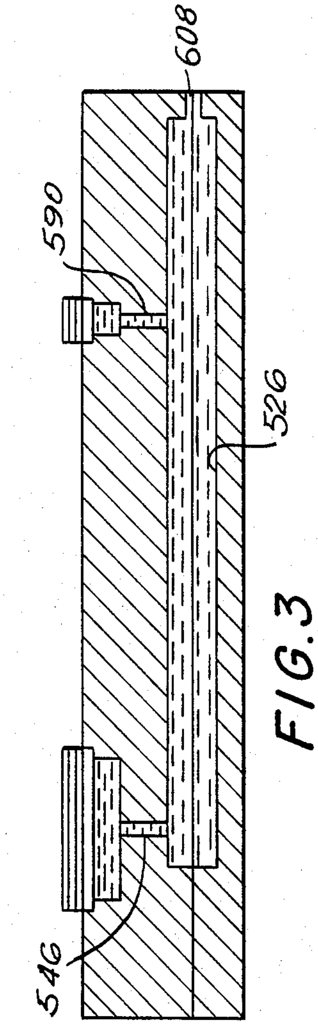
FIG.3 PRIOR ART

Reference is first made to FIG. 1 which depicts an ink jet print head, generally indicated at 200, constructed in accordance with the prior art such as is disclosed in U.S. Pat. No. 4,104,645. As depicted in FIG. 1, print head 200 includes nine nozzle orifices 5. Six transducer or pressurization chambers including an X-group and a Y-group are provided. The X-group includes three transducer chambers Xa, Xb and Xc and the Y-group also includes three transducer chambers Ya, Yb and Yc. Flow or passages 2 exiting from conduits 1 communicating with transducer chambers Xa, Xb and Xc of the X-group and flow passages 4 exiting from conduits 3 communicating with transducer chambers Ya, Yb and Yc of the Y-group together communicate with nozzle orifices 5 respectively. In this construction, ink droplets are ejected from nozzle orifices 5 which are driven by both of the corresponding transducer chambers in the X-group and Y-group. Thus, this matrix drive construction contributes to a decrease in the number of transducer or pressurization chambers, piezoelectric elements and drivers required in an ink jet print head.

However, this embodiment suggested in U.S. Pat. No. 4,104,645 and depicted in FIG. 1 has the following disadvantages. First, flow passages 2 and 4 exiting from X-group and Y-group, respectively, of transducer chambers are required to be crossed in multiple levels in a print head, which construction is extremely difficult to fabricate. Second, in view of such an arrangement that flow passages 2 and 4 and an ink supply passage 6 need to be concentrically gathered around each nozzle orifice 5, it is difficult to dispose the nozzles in very close relation. In spite of this, if the nozzles are intended to be closely disposed, the cross-sectional area of each of the flow passages 2 and 4 and the ink supply passage 6 should be excessively small, which results in reduced efficiency of ink ejection. In order to raise the efficiency, the pressurization chambers should have greater volume.

U.S. Pat. No. 4,104,645 also suggests the embodiment depicted in FIG. 2. In this embodiment, print head 300 includes two pressurization or transducer chambers Xad and Yad for a single nozzle 426 are formed on opposed surfaces 250 and 252, respectively. In order to improve print head 300 to a multiplex drivable head including pressurization chambers which are far fewer in number than nozzles, flow passages 420, 422 and 424 are required to cross partially one above another in multiple levels similar to that described above with respect to the embodiment depicted in FIG. 1. The assembly of such construction is difficult. Moreover, the flow resistance in the flow passages 420, 422 and 424 interconnecting the pressurization chambers Xad, Yad and the nozzle 426 is added to the flow resistance in nozzle 426 so that the efficiency of ink ejection is lowered. Therefore, the pressurization chamber should have a larger area to increase efficiency.

U.S. Pat. No. 4,104,645 also suggests the embodiment depicted in FIG. 3. This embodiment requires n+1 pressurization chambers, piezoelectric elements and drivers for n nozzles. Hence, this embodiment does not satisfy an object of multiplex drive to decrease the number of parts. Furthermore, the flow resistances in flow passages 526, 546 and 590 are added to the flow resistance in nozzle 608 like the embodiment shown in FIG. 2 to increase flow resistance.

In the aforementioned constructions, two pressurization chambers are allowed to correspond in number to a nozzle so as to attain the multiplex drive or to raise the efficiency of ink ejection. Accordingly, these embodiments include some disadvantages such as difficulty in fabricating an ink jet print head by crossing nozzles in the head one above another in three dimensions, reduction of ink ejection efficiency caused by the addition of the flow resistance in the flow passages to that in the nozzle orifices, and reduction of ink ejection performance caused by shortage of supplied ink, and the like. Besides, even if air bubbles happen to be generated in one of the flow passages, they are not pushed out due to the complicated configuration of the flow passages, so that ink ejection cannot occur.

Figure 4B:
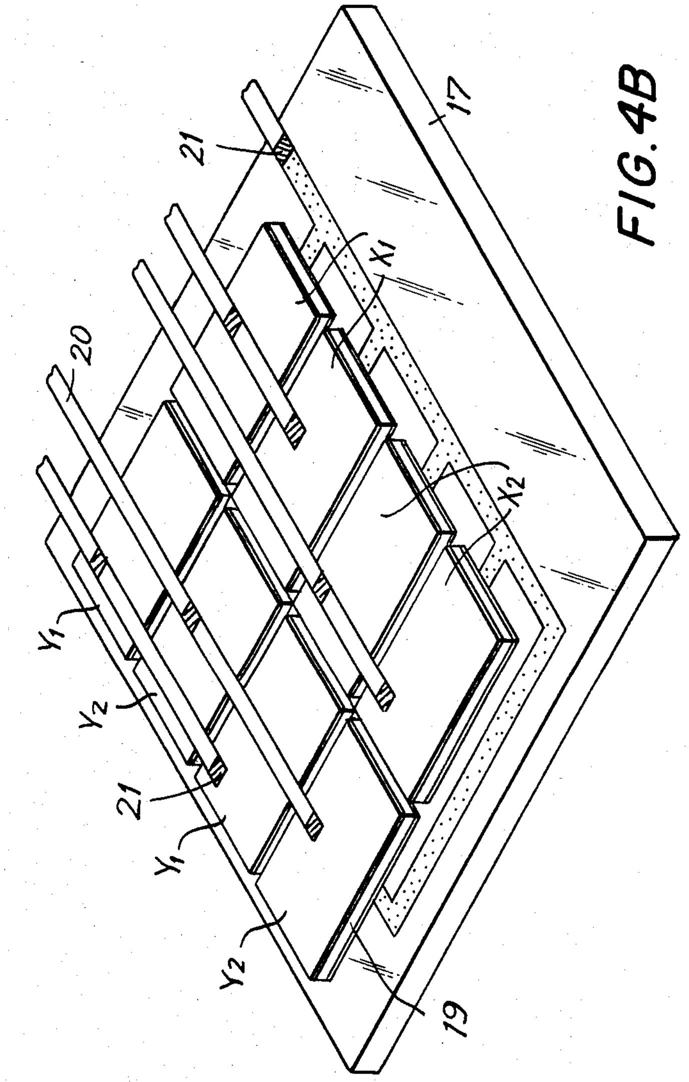
FIGS. 4B, 4C and 4D are perspective views of modifications of the ink jet printing apparatus depicted in FIG. 4A constructed in accordance with alternative embodiments of the present invention.
Figure 4A:
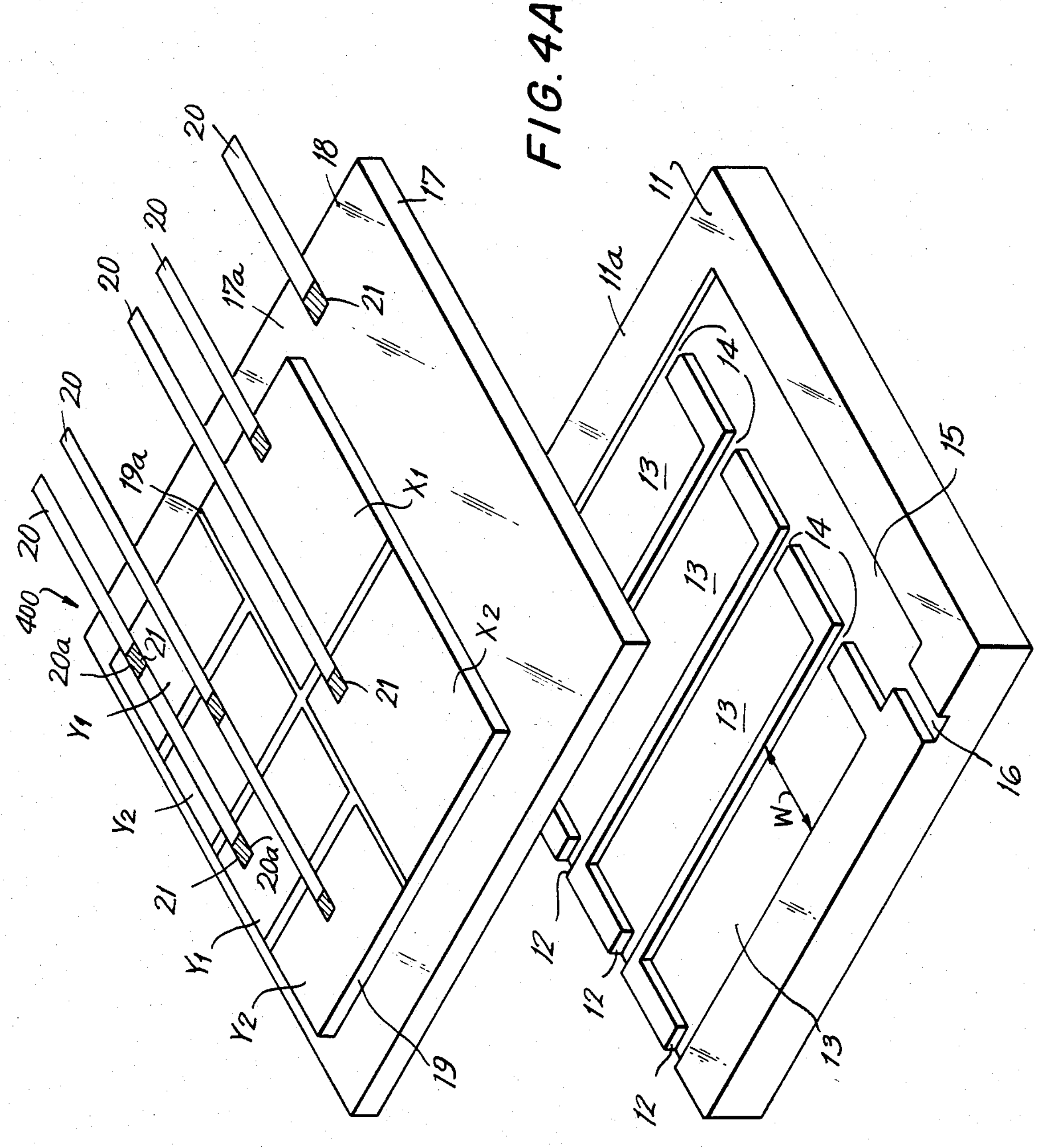
FIG. 4A is an exploded perspective view of an ink jet printing apparatus constructed in accordance with the present invention.
Figure 4C:
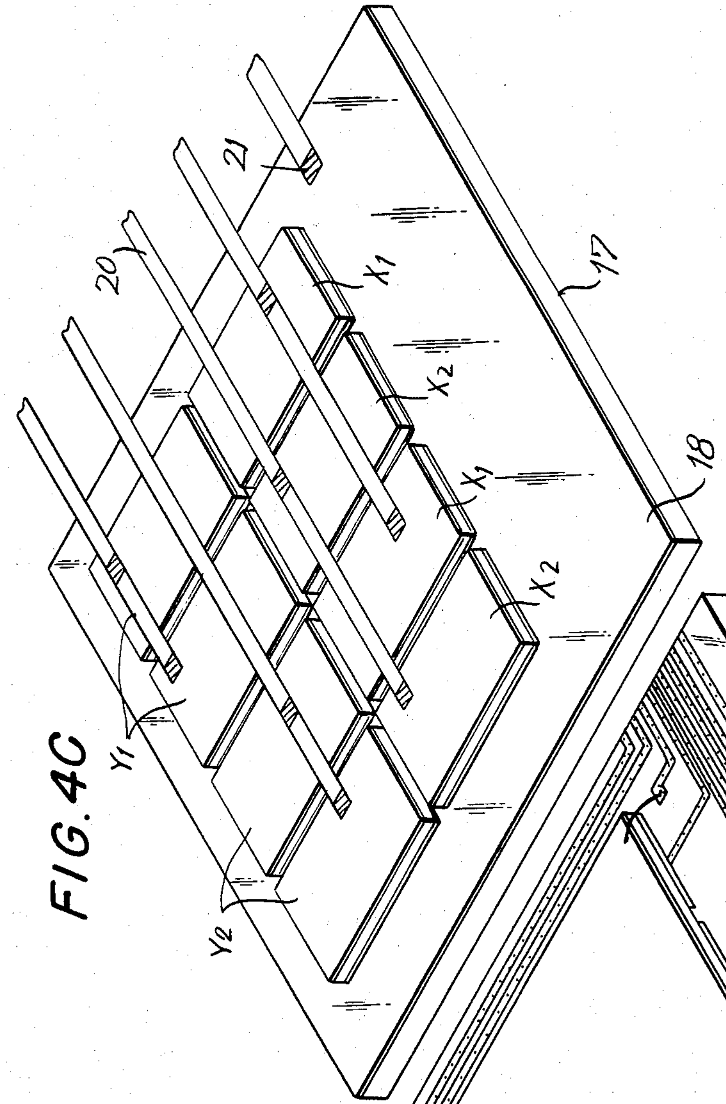
Figure 4D:
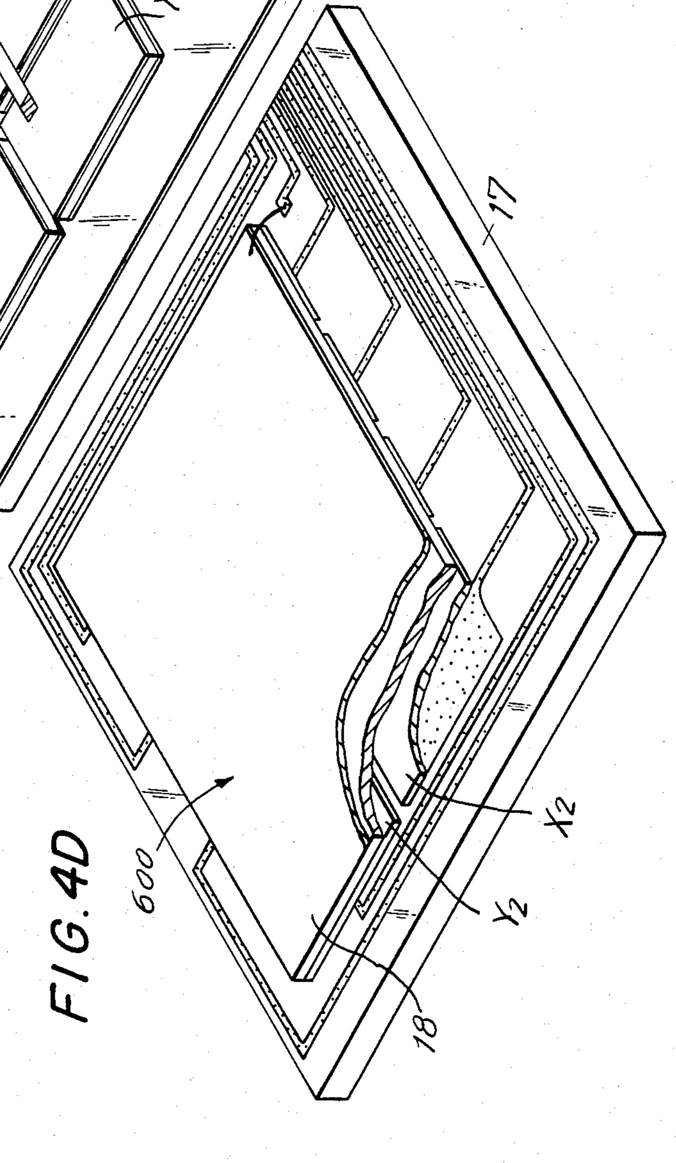

Reference is now made to FIGS. 4A through 4D which depict a first embodiment of the present invention. An ink jet print head 400 includes a base plate 11 having a surface 11*a* preferably made of soda-lime glass which is etched to have four sets of nozzles 12, a pressurization chamber 13 corresponding to each nozzle 12, an ink supply passage 14 for each pressurization chamber 13, an ink supply preparing chamber 15 and an ink supply inlet 16. A vibration plate 17 preferably made of the same material as that of base plate 11 is welded or otherwise secured to base plate 11. A surface 17*a* of vibration plate 17 is covered with an electrode 18 preferably of nesa film. A piezoelectric element 19 is adhered to common electrode 18 in correspondence to the four pressurization chambers 13. On the top surface 19*a* of piezoelectric element 19, electrodes X1 and X2 in an X-group and Y1 and Y2 in a Y-group are formed by screen printing. A plurality of wires 20 having an insulating coating of copper leaf disposed on the bottom surface of an FPC, i.e. flexible printing cable (not shown) has portions 20*a* shown hatched in FIG. 4 having no insulative coating, which portion is a connecting portion 21 in contact with an electrode of the X-group or the Y-group or the common electrode 18. Each of the connecting portions 21 is pressed and affixed to its respective electrodes, as depicted. Different electrode and connecting arrangements than that depicted in FIG. 4A are possible as depicted in FIGS. 4B–4D.

The operation of these constructions are described with reference to FIGS. 5, 6A and 6B. In FIG. 5, an ink jet printing apparatus 500 includes an ink tank 21, an ink conduit 20, an ink supply inlet 16, an ink supply preparing chamber 15 and ink supply passages 14 and drivers x1, x2, y1 and y2.

The flow passages 16 and 15 exiting from conduit 20 and entering to the respective nozzle orifices 12-1 to 12-4 through ink supply passages 14-1 to 14-4 and pressurization or transducer chambers 13-1 to 13-4 are filled with ink. Upon driving the drivers x1 and y2 simultaneously, portions of piezoelectric element 19 corresponding to electrodes X1 and Y2, respectively, are deformed as shown in FIGS. 6A and 6B, respectively, to thereby increase the volume of pressurization chambers 13-1, 13-2 and 13-4. Upon removing application of the signal to the drivers in synchronization with the resonance frequency determined by the respective flow passages, vibration plates 17, etc., vibration plate 17 is restored to the former condition with the damped oscillation matching with the resonance frequency. This deformation of the vibration plate for returning to original configuration is utilized for ejecting ink droplets from the nozzles. It is confirmed both theoretically and experimentally that such a method is more advantageous to lowering of drive voltage, decrease in area of the pressurization chambers, improvement in response, and decrease in diameter of an ink droplet, than the method of directly contracting the pressurization chamber with a signal to the piezoelectric element. As is apparent from FIGS. 6A and 6B, only the pressurization chamber 13-2 selected by both the drivers x1 and y2 makes a deformation enough to eject ink droplets from nozzle 12-2. On the other hand, the pressurization chambers 13-1 and 13-4 equally make deformation approximately half as much as the pressurization chamber 13-2, wherefore ink droplets are not ejected from the nozzles 12-1 and 12-4.

As is apparent from this embodiment, a multiplex drivable head is easily obtained only by adhering a vibration plate to a flat plate on which grooves of nozzles, pressurization chambers and supply passages are formed and by dividing electrodes on a piezoelectric element so as to be appropriately disposed with respect thereto. There is little flow resistance except in nozzles 12-1 to 12-4 and supply passage 14-1 to 14-4 so that ink ejection is effectively performed and the responsive speed is raised. Since the present embodiment has four combinations of nozzles, the number of wires 92 and drivers x1, x2, y1 and y2 is also four except that of the electrode common to both the X- and Y-groups. This produces no benefit. However, practically in the case where 1600 nozzles are laterally aligned, for example, it is sufficient to prepare only 80 wires and drivers respectively. On the other hand, the pressurization chambers are the same in number as the nozzles, however, this is not a problem. For difficulty in processing or fabricating is relevant to nozzles. Therefore, even if the pressurization chambers are increased in number, that does not affect increase of difficulty in manufacturing a print head. Furthermore, in the present embodiment, since there is provided one piezoelectric element covering all the pressurization chambers, increase in the number of pressurization chambers is not accompanied with that of increase in the number of piezoelectric elements. However, the piezoelectric element is separable for raising efficiency in ink ejection in accordance with the width of each pressurization chamber as shown in FIG. 4C, otherwise it is possible to attach piezoelectric elements corresponding respectively to each of the pressurization chamber as shown in FIG. 4C.

With specific reference to another embodiment illustrated in FIG. 4D, if a surface of a electro-mechanical transducer 600 having divided electrodes is attached to the vibration plate, lead wires connecting the electrodes and the drive circuits can be formed on the vibration plate by screen printing and the like. Accordingly, there is no need of preparing any wire except the common electrode 18 formed on the outer reverse surface of the electro-mechanical transducer. This promotes efficiency in fabricating such construction. It is to be distinctly understood that the disposition of the piezoelectric elements for the pressurization chambers are not limited to such an embodiment as shown in the drawings, and that modifications and variations are possible in light of the above teachings.

As described above, in the present embodiment, the pressurization chamber expands upon application of a drive voltage signal to the piezoelectric element portion corresponding thereto and contracts upon removal of the signal in synchronization with the resonance frequency of a vibratory system containing ink to thereby eject ink droplets. This construction produces such advantages as lowering of driving voltage and improvement in response. In order to gain such advantages, it is less desirable that the resonance frequency generated in application of a signal to X-group is different from that generated in application of the signal to Y-group, and that the vibratory system selected by both the X- and Y-groups generates a complicated resonance frequency.

In the present invention, X- and Y-groups of electrodes are provided on the common vibration plate corresponding to the same pressurization chamber, whereby the vibration plate makes the constant vibration irrespective of rate in area between the electrodes X and Y. Therefore, the pulse width of each signal applied to respective electrodes is allowed to be uniform, which facilitates control. It is desirable that the electrodes X and Y have substantially the same area in order to prevent ink ejection in the half selection (in the case where either electrode X or Y is driven). More detailedly, in FIG. 4A, the area of electrodes Y near to nozzles 12 is permitted to be smaller than that of electrodes X since the fluid impedance in the pressurization chamber is smaller in the electrodes X portion than in the electrodes Y portion.

In addition, the base plate 11 is an etched glass plate in the embodiment shown in FIGS. 4A–4D, however, it is also permitted to use a base plate of injection molded plastics. Moreover, it is acceptable to form a piezoelectric element on a glass vibration plate with a coating technique. It is also permissible to form grooves of the nozzles, pressurization chambers, etc. on the surface of the vibration plate. Furthermore, if such grooves are formed on the opposed surfaces of the base plate 11 so as to provide a head comprising a double number of nozzles formed on opposed surfaces of the base plate as shown in FIG. 18, high density in appearance of nozzles is attained.

The configuration of the pressurization chamber is not restricted to that of the embodiment shown in FIG. 4A. However, as shown in FIG. 4A, a head comprising thin and long pressurization chambers like strips aligned at the same pitch as nozzles, and nozzles directly connected to pressurization chambers is suited for comprising nozzles more than 1000 in density of 5 nozzles/mm or more, since there is little resistance in the flow passages including the pressurization chamber and the nozzle.

Reference is now made to FIGS. 7A and 7B which illustrate another embodiment of the present invention in which FIG. 7A shows a piezoelectric element divided in two longitudinally for one pressurization chamber and FIG. 7B shows a piezoelectric element divided into 4 sections for one pressurization chamber.

FIG. 8 illustrates another embodiment of the present invention in which the piezoelectric elements 19*a* and 19*b* are provided on the opposed surfaces 13*a* and 13*b*, respectively, of the pressurization chamber 13 and each piezoelectric element 19*a* and 19*b* is provided respectively with electrodes X and Y. However, this embodiment is not so suited for increase in density as compared with the embodiments shown in FIGS. 4A–4D. For example, in the case where nozzles are arranged at a pitch of 10 nozzles/mm, the width W of the pressurization chamber as depicted in FIG. 4A needs to be less than 100 mm. In this case, even if the vibration plate and the piezoelectric element are rendered thinner, the rigidity of the vibratory system comprising the vibration plate and the piezoelectric element is extremely increased so that most of the drive energy is consumed for deformation of the vibratory system. A head comprising a piezoelectric element disposed above one surface of a pressurization chamber, as shown in FIG. 4A, is modifiable to have flow passages, vibration plates and piezoelectric elements above the opposed surfaces of the base plate as shown in FIG. 18, whereby a nozzle pitch for nozzles formed on a surface of the base plate is double a pitch between two adjacent dots to be printed for formation of characters or symbols. Furthermore, in the above example, the width W of the pressurization chamber can be a little less than 200 μm. Where the vibration plates composing the pressurization chambers are like strips, the rigidity of a strip is in inverse proportion to fifth power of a strip width W whereas conductance is proportional to the fifth power of the width W, in general. Accordingly, a pressurization chamber of 200 μm width has a conductance 32 times as much as the pressurization chamber of 100 μm width has.

In contrast, a head having piezoelectric elements disposed on the opposed surfaces thereof and including nozzles disposed at 100 μm pitch as shown in FIG. 8, has conductance only twice as much as that of the vibratory system in a head having piezoelectric element disposed on only one surface thereof and including nozzles disposed at 100 μm pitch. From the preceeding, the head shown in FIG. 4A has approximately 16 times of conductance in the vibratory system as compared with the head shown in FIG. 8. Consequently, the energy efficiency increases with the increment of density in a head.

With regard to the flow resistance in the pressurization chamber, the head shown in FIG. 18 is more advantageous in that the width of the pressurization chamber is greater than that of the head shown in FIG. 8.

FIG. 9 illustrates a modified embodiment of the present invention in which a head 700 includes a cylindrical pressurization chamber 30 on whose periphery 30*a* a tube 31 of piezoelectric element is adhered. The electrode disposed on the periphery of tube 31 is divided into two electrodes, 32-X and 32-Y for driving a number of heads constructed as shown in FIG. 9 when gathered, whereby multiplex drive in combination of X- and Y-groups can be performed. However, it is difficult to gather a number of nozzles in higher density as compared with the embodiments shown in FIGS. 4A–4D and 8.

In the above-described embodiments, a pressurization chamber is provided with electrodes X and Y, and if voltage is applied to both the electrodes X and Y for a given pressurization chamber, ink droplets are ejected from a nozzle corresponding to the same pressurization chamber. Modifications of the present invention can be considered, for example, when only electrode X is actuated, ink jet ejection can be performed, whereas when electrode Y is actuated in the direction opposite to electrode X for preventing mix ejection. In this example, the pressurization chamber provided with electrode X actuated and electrode Y deactuated can effect ejection of ink droplets.

FIG. 11 illustrates another embodiment of the present invention wherein a nozzle 12, a pressurization chamber 13 and a supply passage 14 are formed as grooves on the surface of a base plate 11. A vibration plate 17 has a surface 17*a* on which two piezoelectric elements 191 in an X side and 192 in a Y side are disposed in layers. Wires 106, 107 and 108 exiting from the piezoelectric elements 191 and 192 are connected to a driver (not shown). Nozzle 12, the pressurization chamber 13 and ink passage 14 are filled with ink.

In this construction, if voltage is applied to wires 106 and 107, or 107 and 108 in respective combinations, the piezoelectric elements 191 and 192 contract in the directions of arrows A and B respectively. Then, vibration plate 17 is bent inwardly with piezoelectric elements 191 and 192 which are attached to vibration plate 17. As a result, pressurization chamber 13 decreases in volume, which effects ejection of some quantity of ink for printing from nozzles 12.

FIGS. 12A and 12B illustrate the principles for applying multiplex drive to the print head shown in FIG. 11. This example includes four nozzles 102*a*, 102*b*, 102*c* and 102*d* on print head 850. Print head 850 includes an ink tank 21 for supplying ink to each supply passage 14-1 to 14-4, and drivers x1, x2, y1 and y2. FIG. 12A illustrates the portion of piezoelectric element 191 (FIG. 11) in the X side, on which piezoelectric element 192 (FIG. 11) in the Y side shown in FIG. 12B is provided. As depicted in FIG. 11, when either of the piezoelectric elements 191 or 192 is actuated, the vibration plate 17 is bent substantially half as much as when the piezoelectric elements 191 and 192 are actuated, with the result that no ink ejection is performed when only one is actuated. Therefore, in FIGS. 12A and 12B, if drivers x1 and y1 are actuated, ink droplets are ejected from only the nozzle 102*a* coupled to pressurization chamber 13*a* selected through piezoelectric elements X1 and Y1. The example shown in FIGS. 12A and 12B includes four nozzles, which produces no advantage for multiplex drive. However, since m×n nozzles are actuated by m+n drivers in general in such a construction, a multinozzle head having more than 1000 nozzles, for instance, is greatly advantageous.

Figure 13:
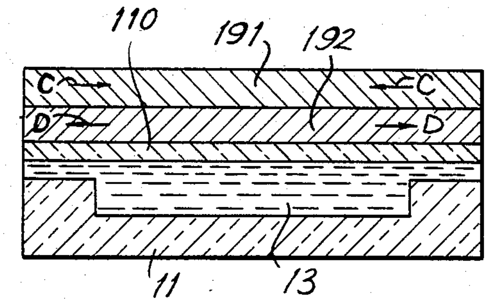
FIG. 13 is a side sectional view illustrating another embodiment of the ink jet printing apparatus of the present invention.

FIG. 13 illustrates another embodiment of the present invention. This embodiment is different from the embodiment shown in FIG. 11 in that upon applying voltage, piezoelectric element 191 contracts in the direction of arrows C, while piezoelectric element 192 expands in the direction of arrows D. This two layer piezoelectric element construction causes the pressurization chamber 13 to change in volume. A bonded layer 110 does not operate as a vibration plate but operates only for allowing the piezoelectric element to be bonded to a base plate 11 for forming a flow passage.

Additionally, in accordance with the embodiments shown in FIGS. 11 and 13, piezoelectric elements are piled up or layered respectively as correspondent to each pressurization chamber for attaining multiplex drive. However, other embodiments are also permissible, such as the construction wherein a piezoelectric element is provided in layers to cover a plurality of pressurization chambers and electrodes are provided respectively as correspondent to each pressurization chamber.

As mentioned above, in accordance with the present invention, two piezoelectric elements in the X and Y sides are disposed in layers on outer walls of pressurization chambers corresponding in number to nozzles, wherein signals are separately applied to X or Y piezoelectric elements to thereby provide a multiplex drive with fewer wires and driving circuits.

In the above-mentioned embodiment, ink ejection speed is not so high. In a half-selected condition, initial ink ejection speed is substantially half as much as in the completely selected condition. Therefore, it is likely that surface tension of ink must be overcome to thereby eject ink droplets.

FIG. 10 illustrates an application of the present invention in which the above-described problems are solved. In this example, an air cover 40 is provided in a head 800, air is injected from an air supply inlet 41 and an air current is discharged from an air outlet 42 formed like a slit in front of a nozzle 12, whereby ink droplets are ejected at a higher speed with the aid of the air current. Since the air outlet 42 is slit-like, there is no difficulty in manufacturing the air outlet as compared with manufacturing a circular opening in conventional ink jet heads which utilizes air currents. The air outlet is easy to be obtained by fixing two plates slightly spaced out.

The following embodiments are ink jet print heads improved from the present invention in the speed of ink ejection from a selected nozzle.

Figure 14:
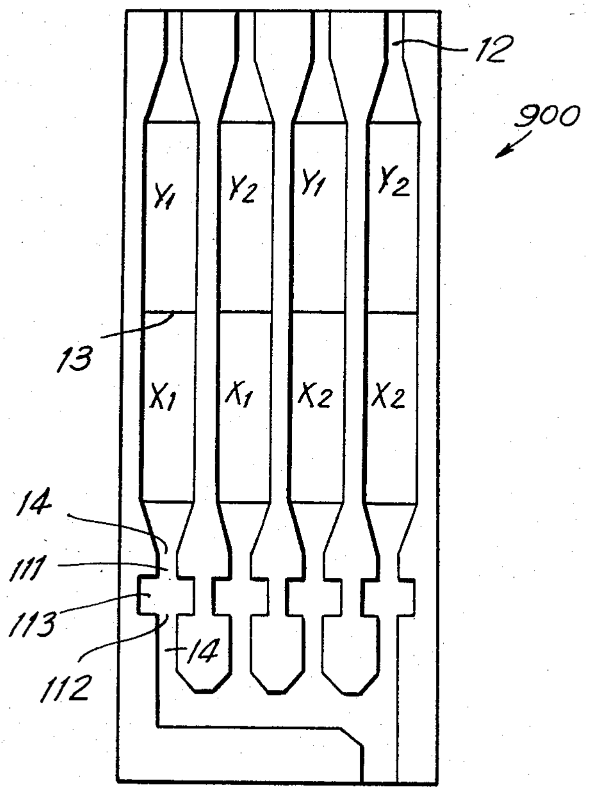
FIG. 14 is a top plan schematic view for explaining the principles of operation of the ink jet printing apparatus of the present invention in which ink ejection speed is increased.

FIG. 14 illustraes a four-nozzle head 900, which is applicable to a multi-nozzle head including about 2000 nozzles in fact. In the head, there is formed an ink flow passage comprising a nozzle 12, a pressurization chamber 13, etc. similar to that shown in FIG. 4A.

Piezoelectric elements X1, X2, Y1 and Y2 are set out in matrix form. This embodiment is characterized by that a flow passage 113 has an abruptly expanded portion 111 and an abruptly contracted portion 112 in a part of a supply passage 14 as seen from the pressurization chamber side.

The loss of a head $h_1$ in the abruptly expanded portion 111 is given by the expression.

$$h_1=\xi 1(V^2/2\cdot g) \quad ①$$

$$\xi_1=\Xi[1-(A_1/A_2)]^2 \quad ②$$

wherein $\Xi=1$; $A_1$: a cross sectional area of flow passage 14; $A_2$: a cross sectional area of flow passage 13; V: a fluid velocity of flow passage 14; and g: acceleration of gravity.

The loss of head $h_2$ in the abruptly contracted portion 112 is given by the expression:

$$h_2=\xi_2(V^2/2\cdot g) \quad ③$$

wherein the loss coefficient $\xi_2$ is a constant given by $A_1/A_2$, for example, when $A_1/A_2=0.5$, $\xi_2=0.25$.

From the equation ②, if $A_1/A_2=0.5$, $\xi_1=0.25$.

Accordingly, when $A_1/A_2=0.5$, the sum of the loss of the head of the abruptly expanded portion 111 and that of the abruptly contracted portion 112 is given by the expression:

$$h=h_1+h_2=0.5(V^2/2\cdot g) \quad ④$$

Figure 15:
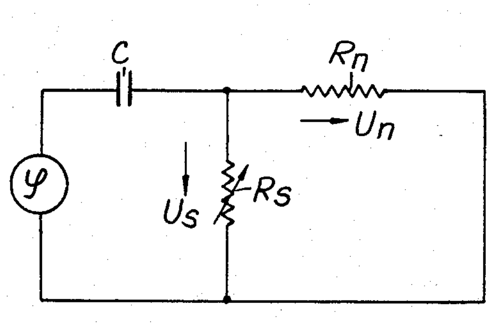
FIG. 15 is an schematic circuit diagram illustrating the equivalent circuit of the embodiment depicted in FIG. 14.

FIG. 15 illustrates an equivalent circuit for explaining the head shown in FIG. 14. In FIG. 15, $\psi$ denotes a pressure applied to the piezoelectric element, C compliance in the vibratory system, Rn resistance in the nozzle, and Un volume velocity of the ink flowing in the nozzle. In this circuit, the resistance $R_S$ in the supply passage is changed with the volume velocity $U_S$ of ink flowing therein. The pressure descent $\psi_S$ in the supply side is given by adding the pressure descent made in the abruptly contracted portion 112 and expressed by the equation ④ to the pressure descent proportional to the velocity in the supply passages 14 and the flow passage 113. Therefore, the pressure descent $\psi_S$ in the supply side is given by the expression:

$$\psi_S=R_{SO}U_S+K\,U_S^2 \quad ⑤$$

wherein K: a proportional constant; and $R_{SO}$: a flow resistance in the supply passage 14 and the flow passage 113.

On the other hand, in a broad perspective, the pressure descent $\psi_S$ in the supply side is expressable by:

$$\psi_S=R_S\cdot U_S \quad ⑥$$

From the equations ⑤ and ⑥, the resistance $R_S$ in the supply side is given by the expression:

$$R_S=R_{SO}+K\,U_S \quad ⑦$$

Accordingly, if the pressure $\psi$ descends, with which the volume velocity $U_S$ is decreased, the resistance $R_S$ in the supply side is decreased in accordance with the equation ⑦. The resistance $R_S$ in the supply side is decreased more than the rate of quantity of ink escaping backwards is increased. Consequently, the decrease of the volume velocity in the nozzle side is remarkable as compared with the rate of decrease of the pressure $\psi$.

As described above, the fluid speed in the supply passage in half selected condition is made less than half of the fluid speed in the supply passage in a selected condition, namely, the fluid speed in the nozzle under a selected condition is increased by providing a flow passage in the supply side, in which loss of pressure is changeable proportionally to the square of the fluid speed.

FIG. 17 shows a comparison between curves F and G, wherein the curve F shows the fluid speed in the case where aforementioned improvement is made in the supply passage and the curve G shows the fluid speed in the case where such improvement is not worked in the supply passage. The point E shows a voltage limit over which surface tension of ink in the nozzle is overcome to thereby effect ink ejection. If the supply voltage V is constant, the fluid speed at ink ejection shown by the curve F is made higher than the fluid speed shown by the curve G as the comparison shown by $\Delta v$. The minus values of the fluid speed show decrease of kinetic momentum of ink caused by the surface tension of ink.

FIGS. 16A–D illustrate various shapes of fluid passages applicable to the present invention. FIG. 16A shows a supply passage utilizing loss of pressure caused by an elbow 120, wherein the loss of head $h_e$ per one elbow is given by the expression:

$$h_e=\xi_e(V^2/2\cdot g) \quad ⑧$$

$$\xi_e\approx 0.99$$

FIG. 16B shows the supply passage 14 having a narrowed down portion 121. FIGS. 16C and 16D are illustrative of the supply passage 14 having the fluid diodes 122 and 123 for gaining loss of pressure proportional to the square of the fluid velocity in the fluid passage 14 and for raising the efficiency of ink ejection. In FIG. 16C, the supply passage 14 has portions suddenly expanded and contracted in cross section. In FIG. 16D, the supply passage 14 utilizes divergence and confluence for attaining the above-mentioned objects.

As described above, according to the present invention, the supply passage in which pressure is changeable proportionally to the square of the fluid velocity is provided in the supply side, whereby the fluid velocity in the supply passage in the selected condition is made more than twice as high as the fluid velocity in the supply passage in the half selected condition so that ink ejection speed is raised.

It is also true that the configurations of the supply passages shown in FIGS. 14 and 16A–D are applicable, not only to the multiplex drivable head shown in FIG. 4A, but also to various multinozzle heads for ejecting ink droplets selectively by driving two piezoelectric elements.

As described above, according to the present invention, one pressurization chamber is provided for each nozzle and an electromechanical conversion element disposed for changing volume of the pressurization chamber is divided into two elements to which separate signals are applied respectively, whereby it is realized to obtain a multi-nozzle head with multiplex drive requiring fewer wires and drivers.

According to the present invention, it is possible to provide an easily fabricated head effecting efficient ink injection and having low fluid impedance and having less area as a whole. It is also possible to provide a disposition of nozzles in high density. The low flow resistance does not require such a long time for ink supply. The flow passage has no portions in which ink is stagnant because of less complexity in form so that air bubbles are discharged from the nozzle even if they happen to be generated. Furthermore, the pressurization chamber increases its volume and then contracts to the former condition in synchronization with the resonance frequency, whereupon ink is ejected. This method produces such effects as less consumption of drive voltage, decrease in area of the pressurization chamber, improvement of response, and improvement of divided printing caused by a decrease in the diameter of ink droplets. Thus, the present invention is applicable for use in printers, plotters, facsimile copiers and various hard copy devices.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An ink jet printing apparatus for ejecting ink for printing comprising a plurality of nozzles and pressurization chambers equal in number to the number of said nozzles, each nozzle being in fluid communication with a different one of said pressurization chambers, ink supply means for supplying ink to said pressurization chambers, each said pressurization chamber having first and second transducer means corresponding thereto for selectively deforming said pressurization chambers for ejecting ink out of said respective nozzles, and multiplex driver means for independently driving said first and second transducer means.

2. The ink jet printing apparatus as claimed in claim 1, wherein said driver means includes an independent driving circuit for each said first and second transducer means.

3. The ink jet printing apparatus as claimed in claim 2 wherein each said first and second transducer means are electromechanical transducer means.

4. The ink jet printing apparatus as claimed in claim 3, wherein said plurality of nozzles and plurality of pressurization chambers are formed on the same surface of a plate.

5. The ink jet printing apparatus as claimed in claim 4, wherein each said pressurization chamber is proximate the nozzle to which it corresponds.

6. The ink jet printing apparatus as claimed in claim 5, wherein said ink supply means includes a plurality of ink supply passages in fluid communication with said pressurization chambers, said ink supply passages being formed in said surface of said plate.

7. The ink jet printing apparatus as claimed in claim 1 wherein each said first transducer means is closer to said nozzle to which it corresponds than said respective second transducer means, said first transducer means being of the same size as said second transducer means or being smaller than the latter.

8. The ink jet printing apparatus as claimed in claim 1, wherein each said pressurization chamber includes a first wall and a second wall with said pressurization chamber therebetween, each said first and second transducer means being disposed on said first wall of said pressurization chamber to which they correspond.

9. The ink jet printing apparatus as claimed in claim 1, wherein each said pressurization chamber includes a first wall and a second wall with said pressurization chamber therebetween, each said first transducer means being disposed on a respective first wall, each said second transducer means being disposed on a respective second wall.

10. The ink jet printing apparatus as claimed in claim 8, wherein each said first and second transducers are disposed one atop the other on said respective first wall.

11. The ink jet printing apparatus as claimed in claim 1, further comprising an air cover means for directing ink out of respetive nozzles.

12. The ink jet printing apparatus as claimed in claim 11, wherein said air cover means includes a discharge opening in registration with each said nozzle and an air supply opening, said air cover means further including air supply means for supplying air to said air supply opening to be discharged through said respective discharge openings.

13. The ink jet printing apparatus as claimed in claim 1, wherein said ink supply means includes a flow passage, said flow passage yielding loss of pressure proportional to the square of the ink flow speed in said passage.

14. An ink jet printing apparatus comprising a plurality of nozzles and pressurization chambers equal in number to the number of said nozzles, each said nozzle being in fluid communication with a different one of said pressurization chambers, ink supply means for supplying ink to said pressurization chambers, electromechanical transducer means for selectively deforming said pressurization chambers, said electro-mechanical transducer means having a piezoelectric element which essentially covers at least two of said pressurization chambers, said piezoelectric element having first and second surfaces, a common electrode disposed on said first surface of said piezoelectric element and extending to cover substantially the whole area of at least one pressurization chamber, a first electrode disposed on the second surface of said piezoelectric element and covering a portion of said second surface, a second electrode disposed on the second surface of said piezoelectric element and covering another portion of said second surface, and multiplex driver means for independently energizing said first and second electrodes.

15. The ink jet printing apparatus as claimed in claim 14, wherein said first electrode extends to cover substantially half the area of said pressurization chamber and said second electrode extends to cover substantially the other half of said pressurization chamber.

16. The ink jet printing apparatus as claimed in claim 15, wherein said driver means includes an independent driving circuit for said first and second electrodes.

17. The ink jet printing apparatus as claimed in claim 8, wherein said driver means acts to selectively deform the wall of each said pressurization chamber so that each said wall bows outwardly upon application of a signal to said respective first and second transducer means, ech said wall being returned to its normal condition when said signal is removed.

18. The ink jet printing apparatus as claimed in claim 14, wherein said pressurization chamber having said first and second electrodes includes a wall, said driver means deforming said wall to bow outwardly when a signal is applied by said driver means to said first or second electrodes.

19. The ink jet printing apparatus as claimed in claim 18, wherein said wall returns to its normal condition when said signal is removed.

20. The ink jet printing apparatus as claimed in claim 18, wherein said first electrode is disposed closer to said nozzle than said second electrode, said first electrode having a smaller area than said second electrode.

21. The ink jet printing apparatus as claimed in claim 18, further comprising an air cover means for directing ink out of respective nozzles.

22. The ink jet printing apparatus as claimed in claim 18, wherein said air cover means includes a discharge opening in registration with each said nozzle and an air supply opening, said air cover means further including air supply means for supplying air to be discharged through said respective discharge openings.

23. The ink jet printing apparatus as claimed in claim 18, wherein said ink supply means includes a flow passage, said flow passage yielding loss of pressure proportional to the square of the ink flow speed in said passage.

24. The ink jet printing apparatus as claimed in claim 23, wherein said flow passage is elbow-shaped.

25. The ink jet printing apparatus as claimed in claim 23, wherein said flow passage has a narrowed down portion.

26. The ink jet printing apparatus as claimed in claim 23, wherein said flow passage is triangle in cross-section.

27. The ink jet printing apparatus as claimed in claim 23, wherein said flow passage is heart-shaped.

28. The ink jet printing apparatus as claimed in claim 13, wherein said flow passage is elbow-shaped.

29. The ink jet printing apparatus as claimed in claim 13, wherein said flow passage has a narrowed down portion.

30. The ink jet printing apparatus as claimed in claim 13, wherein said flow passage is triangular in cross-section.

31. The ink jet printing apparatus as claimed in claim 13, wherein said flow passage is heart-shaped.

* * * * *